(12) United States Patent
Willmes

(10) Patent No.: US 12,134,243 B2
(45) Date of Patent: Nov. 5, 2024

(54) MODULAR PRESS

(71) Applicant: Willmes Anlagentechnik GmbH, Lorsch (DE)

(72) Inventor: Ulrich Willmes, Lorsch (DE)

(73) Assignee: Willmes Anlagentechnik GmbH, Lorsch (DE)

( * ) Notice: Subject to any disclaimer, the term of this patent is extended or adjusted under 35 U.S.C. 154(b) by 0 days.

(21) Appl. No.: 18/029,449

(22) PCT Filed: Aug. 31, 2021

(86) PCT No.: PCT/EP2021/074020
§ 371 (c)(1),
(2) Date: Mar. 30, 2023

(87) PCT Pub. No.: WO2022/069139
PCT Pub. Date: Apr. 7, 2022

(65) Prior Publication Data
US 2023/0364877 A1 Nov. 16, 2023

(30) Foreign Application Priority Data

Sep. 30, 2020 (DE) ..................... 10 2020 125 603.5
Sep. 30, 2020 (DE) ..................... 10 2020 125 608.6

(51) Int. Cl.
*B30B 9/22* (2006.01)
*B30B 15/00* (2006.01)
(Continued)

(52) U.S. Cl.
CPC ................ *B30B 9/225* (2013.01); *B30B 9/22* (2013.01); *B30B 15/0058* (2013.01);
(Continued)

(58) Field of Classification Search
CPC ....... B30B 9/22; B30B 9/225; B30B 15/0058; B30B 15/04; B30B 15/32; B30B 1/003;
(Continued)

(56) References Cited

U.S. PATENT DOCUMENTS 6,994,021 B2   2/2006   Krammer

FOREIGN PATENT DOCUMENTS

| CH | 412577 A | 4/1966 | |
| CN | 208745406 U * | 4/2019 | ............ B30B 15/00 |

(Continued)

OTHER PUBLICATIONS

Benachrichtigung der Richtlinie 2014/68/EU des Europäischen Parlaments und des Rates vom Mar. 15, 2014 zur Harmonisierung der Rechtsvorschriften der Mitgliedstaaten über die Bereitstellung von Drückgeräten auf dem Markt [Directive 2014/68/EU of the European Parliament and of the council of May 15, 2014 on the harmonisation of the laws of the Member States relating to the making available on the market of pressure equipment], Official Journal of the European Union, May 15, 2014. Internet: https://eur-lex.europa.eu/legal-content/EN/TXT/?uri=CELEX%.

*Primary Examiner* — Jimmy T Nguyen
(74) *Attorney, Agent, or Firm* — Laurence A. Greenberg; Werner H. Stemer; Ralph E. Locher

(57) ABSTRACT

An arrangement for pressing materials containing liquid has mobile press container with an container interior that is divided by a press membrane into a pressure medium chamber and a pressing medium chamber. A filling and emptying opening, which can be closed in a pressure-tight manner, allows material to be pressed to be added to the pressing medium chamber. At least one drainage element is arranged in the pressing medium chamber. An interior of the drainage element communicates with a juice discharge of the press container. A turning device, in which the mobile (Continued)

press container is temporarily received can be rotated during a pressing operation from a filling position, about an angle of less than 360°, more particularly of less than 270°, in mutually opposing directions of rotation about an axis of rotation. There is also described a method for pressing liquid-containing materials.

19 Claims, 10 Drawing Sheets

(51) Int. Cl.
*B30B 15/04* (2006.01)
*B30B 15/32* (2006.01)
*C12G 1/00* (2019.01)
*C12G 1/02* (2006.01)

(52) U.S. Cl.
CPC .............. *B30B 15/04* (2013.01); *B30B 15/32* (2013.01); *C12G 1/005* (2013.01); *C12G 1/0209* (2013.01)

(58) Field of Classification Search
CPC ........ B30B 5/02; C12G 1/005; C12G 1/0209; C12G 1/0216; C12G 1/0206; B01D 29/822; A47J 19/06
See application file for complete search history.

(56) References Cited

FOREIGN PATENT DOCUMENTS

| DE | 69005771 T2 | 7/1994 | |
|----|----|----|----|
| DE | 69201029 T2 | 8/1995 | |
| DE | 102004023761 A1 * | 12/2005 | ............... A23N 1/00 |
| EP | 0421503 A1 * | 4/1991 | ............... B30B 9/22 |
| EP | 0144948 B1 | 8/1991 | |
| EP | 0524373 A1 * | 1/1993 | ............... B30B 9/22 |
| EP | 0585596 A1 | 3/1994 | |
| EP | 0611173 A1 | 8/1994 | |
| EP | 1228855 A1 | 8/2002 | |
| EP | 1632338 A2 | 3/2006 | |
| FR | 2530424 A1 | 1/1984 | |
| KR | 20200046242 A * | 5/2020 | ............... B30B 9/22 |
| WO | 03035381 A1 | 5/2003 | |

* cited by examiner

MODULAR PRESS

FIELD AND BACKGROUND OF THE INVENTION

The invention relates to a modular press for pressing liquid-containing product to be pressed, in particular grapes, and to a method for pressing liquid-containing product using such an assembly. The assembly has at least one mobile press container, the container interior of which is subdivided by a press membrane into a pressurized medium chamber and a pressing medium chamber. A filling and discharging opening which can be closed pressure-tight and by way of which liquid-containing product can be filled into the pressing medium chamber is formed in the press container. At least one drainage element is disposed in the pressing medium chamber and an interior of the drainage element communicates with a juice outlet of the press container by way of which liquid juice is supplied to a juice collection container during a pressing procedure.

Presses for pressing liquid-containing substances are known, for example, from EP 0 145 948 B1 and are used for pressing the grape juice, which is used as the initial product for producing wine, from grapes filled into the press. The press described in EP 0 145 948 B1 has a closed container which is able to be set in rotation about the horizontal longitudinal axis thereof. A filling and discharging opening which lies opposite a juice outlet provided on the opposite side of the container and is able to be closed by a cover is located in the shell of the container. Drainage elements in the form of liquid-permeable tubes which are located in a pressing space that is defined by a pressurized medium-tight press membrane which is fastened to the interior of the container and subdivides the container interior into a pressurized medium chamber and the pressing space are provided along the diameter region of the container.

Described in WO 03/035381 A1 is a press which comprises a closed container which is able to be set in rotation about the horizontal longitudinal axis thereof, wherein the container interior is subdivided by at least one press membrane into a pressurized medium chamber and a pressing medium chamber, and a filling and discharging opening which is able to be closed by a cover is disposed in the container shell. The filling and discharging opening lies opposite a juice outlet located in the pressing space. Furthermore disposed in the pressing space are liquid-permeable drainage elements which are disposed across the diameter and so as to be substantially perpendicular to the container axis and which extend from one end of the container to the other end of the container. The drainage elements have a flexible support element about which is disposed a juice-permeable woven fabric hose. In the juice-extracting position, the drainage elements extend in a substantially vertical direction so as to supply the juice into a juice collection port placed below, from where said juice by way of a collection line is directed to a collection container.

The currently commercially available pneumatic fruit and grape presses are generally embodied as a fixedly assembled module and are composed substantially of a machine stand/frame on which the following functional sub-modules are permanently assembled:

A press container which is fully or partially clad with one or a plurality of air-impermeable press membranes which subdivides the press container into a pressurized medium chamber and a product space, and which for filling and for discharging the press residues remaining after pressing is provided with a manually or automatically activated filling and discharging opening. The press container is always mounted on the machine stand so as to be rotatable about the horizontal axis of said press container.

A rotary feedthrough which is expensive to produce and is generally prone to failure and by virtue of the rotation of the press container, which is required for the pressing and discharging, is mandatory in order to enable the supply of media with compressed air, power and optionally control signals required for the operation.

A fixedly assembled drive motor which can set the press container in rotation by suitable gearbox and machine elements.

An apparatus (a so-called primary pressure and vacuum blower) for generating a positive pressure and a negative pressure of approx. +/−100 mbar for throwing the press membrane.

An apparatus for generating a positive pressure of approx. +100 mbar up to approx. +1600 mbar and in special cases even up to 3 bar, which is selectively assembled on the machine stand or as an external compressor including a storage tank is part of the overall installation.

A pneumatic and electrical connection of the individual apparatuses, valves and pipelines etc., and A machine control, in particular PLC, having an operating element which assumes the actuation and visualization of the apparatuses required for the operating sequence.

The presses described above, in various construction sizes having press container volumes of approx. 50 l up to approx. 50 000 l, can be installed and operated as an individual machine or in larger plants in sets of machines. The feeding of the press with pressed product and the removal of the press residues (pomace) is of central importance here. Apart from installing multiple presses in a locally fixed position, said presses may also be installed so as to be movable on rollers so that a multiplicity of spatial constellations are achieved, of which a linearly fixed installation in terms of the infeed and of the removal of pomace has been established as the most economical type of installation.

A further problem of the presses described above can be seen in that the latter generally have a horizontal press container. The background to this lies in that, owing to the required rotation, an ideally high utilization of space and an ideally simple manufacturing, the press containers of all currently known pneumatic presses are embodied substantially as horizontal cylinders, wherein a rolled sheet metal shell between two bases is used. This leads to the press membrane inevitably being embodied as a half-shell, wherein one or else a plurality of membranes are installed depending on the press system. However, owing to the construction mode, the following problems arise in the presses with cylindrical press containers:

The formation of a cone of deposited pressed product when filling by way of the covers of the press container. Owing to the elongate extent of the cylindrical press container and the limited number and size of the filling and discharging openings and covers, cones of deposited product are formed when filling the press with non-liquid pressed product, which prevent the complete filling of the product space in the press container and can be avoided only by rotating the press container.

Problems when discharging the press residues. As is the case during filling, almost complete discharging when discharging the press residues can also only be implemented by way of permanently rotating the press container for an appropriate time (generally 10 to 40 minutes). In some instances, additional spiraliform extraction elements are used to improve discharging, said elements operating according to the principle of dough hooks or spiral baffles of a concrete mixer and apart from the interference effect for the press membrane (when assembled on the side of the pressurized medium) requiring continuous and uniform rotation of the press container.

A further disadvantage of the known presses moreover lies in that the press container, being a pressure container, is configured according to the pressure equipment directive. In this way, the majority of the pneumatic presses known to date for generating the pressure gradient required for pressing use atmospheric positive pressure (1.2 to 2 bar, in special cases up to 3 bar) by which the pressurized medium chamber is impinged by way of the rotary feedthroughs, etc. All parts of the press container, being a pressure container, that are impinged with pressure are thus covered by the pressure equipment directive 2014/68/EU; and the press as a module is considered to be "pressure equipment" in the context of this directive. Apart from the increased costs for the production of the press container, this disadvantageously also leads to one-off and recurring costs for testing by the notified bodies, which in addition to the safety measures included in the installation affect the overall cost effective analysis.

The most cost-intensive aspect in the use of high pressures is the generation of the pressurizing medium in a corresponding quantity.

Moreover, for reasons of process technology, the press container has to be set in rotation during the pressing procedure in order for the pressed product to be loosened and for the press residues to be discharged, and the required media has to be supplied and discharged in the process.

The supply and discharge of the operating media generally takes place by way of rotary feedthroughs which usually comprise the following:

pressurized medium: in most instances compressed air (low pressure/high pressure),
control air for the movement of the automatic closures of the filling and discharging openings,
electric power for the movement of the automatic closures of the filling and discharging openings,
signals for sensors on or in the press container.

As is known, these above-mentioned media are supplied to the press container, or discharged therefrom, by means of rotary feedthroughs for compressed air, suction air and liquids, or in the case of electrical media/signals by slip rings. Owing to the large volumes of pressurized medium which have to be moved in the shortest possible time, the diameters of the required rotary feedthroughs are relatively large, and are between 50 and 150 mm (DN50 to DN150), and so the production and maintenance costs are likewise correspondingly high.

A further problem which enduringly compromises the quality of the grape juice generated, or generally of the pressed product, lies in that the juice created during the pressing procedure is collected in a stationary tub which is located below the rotatable press container. Depending on the embodiment of the press, the juice is prior thereto combined in or on the press container from a plurality of juice outlets and during the rotation, or when the container is stopped, at the lowest point is directed into the stationary tub by gravitation. It is mandatory here for the juice to negotiate the distance between the press container, potential guide plates, to the tub in free fall, because the necessary rotation of the press container does not permit any inherently closed pipe connection.

The lack of process control, which leads to splashing and sloshing, for example, and the uncontrolled effect of the ambient air (oxidation, temperature, etc.) or the possible contamination by dust and in particular insects, the latter being increasingly attracted by the high sugar content of the generated grape juice and often perishing in the juice tub, are disadvantageous in this gravity-based discharge of the juice into the juice tub.

In order for this to be counteracted, it is indeed known for coupling mechanisms to be used, which, in the case of a central collection of the juice on or in the press container, in a corresponding position of the press container at the lowest point direct the juice to a collection tub by mechanical coupling, e.g. by way of an inert gas coupling which in grape pressing is used under inert gas, while largely excluding ambient air. However, this possibility is very cost-intensive, cleaning-intensive and prone to failure.

A further shortcoming, which results from the above-described gravity-based outflow of the pressed grape juice from the press container, lies in that the overall installation height of the press is significantly increased as a result. Owing to the above-described construction modes, the gravity-based outflow and central collection of the product within a collection tub increases the overall height of the press by approx. 300 to 1000 mm, this requiring an enlarged building height during installation and, as a result, potentially frequently leading to problems with existing buildings.

Apart from the increased construction height, the above-described presses for reasons of construction have an increased requirement in terms of space. This can be traced back to the fact that the press container, which assumes approx. 75% to 85% and thus the majority of the installation space, is permanently connected to the frame and the construction components received thereon. In the case of a plurality of presses, the installation space which is required for the supply apparatuses required for each individual press is added thereto.

There is furthermore the problem that, apart from the very minor utilization of the presses in annual terms, the utilization of the installed apparatuses by virtue of the non-continuous pressing procedure is also relatively minor during the pressing. As a result, the drive motor for the container rotation is in operation for approx. 2 minutes only approx. every 3 to 5 minutes. In corresponding pressing programs, the interval occasionally increases even to every 15 to 30 minutes, this corresponding to a utilization factor of only approx. 10% to 40%. Furthermore, the apparatus for throwing the membrane is generally likewise operated for approx. 2 minutes only approx. every 3 to 5 minutes, this corresponding to a utilization factor of approx. 30% to 40%. Moreover, the controller (PLC) and the HMI for automating and visualizing the process are likewise only partially utilized (approx. 30%).

As has furthermore been recognized by the applicant, a further shortcoming is created in that the press as a machine is used within the production process and is operated in a discontinuous processing operation. In this context, it is a common factor to all pneumatic presses with a press container that the system-related processing operation comprises the following operating steps:

1. Filling (duration: between 2 minutes and 2 hours)
2. Pressing procedure (duration: between 60 minutes and 4 hours)

3. Discharging the press residues (duration: between 10 and 30 minutes)
4. Cleaning the press container (duration: between 15 and 30 minutes in the case of rapid cleaning)

Accordingly, once the press has been filled, no further filling of the press can take place for approx. 2 to 6 hours. Consequently, no continuous operation of a single press is possible in the case of a continuous supply of pressed product. In practice, a number of presses adapted to the filling performance and a correspondingly variable filling/transport system have to be provided for continuous processing. It has thus been established by the applicant that, for example, 6 to 7 presses are required for achieving continuous filling, so as to ensure that the first press can be refilled after approx. 4 hours.

A further disadvantage of the presses known to date is the temporary monofunctional utilization of the presses. In this way, the presses within the entire production process of processing the pressed product are used only for the pressing, i.e. the separation of the liquid ingredients from the solid ingredients of the pressed product (in the foodstuff sector: grapes, herbs, fruit, vegetables etc.), this in the processing of grapes taking place 1 to 4 times per day during harvest time (approx. 4 to 6 weeks per year). Occasionally, the press is also used for the maceration procedure (temporary storage/dwelling of the grape mash for approx. 3 to 20 hours prior to pressing). The presses including the container volume are not utilized for the remaining time during harvesting or during the year. Owing to the closed construction mode as a complete module, further potential uses within the production process are possible only to a limited extent or not at all possible.

Finally, a problem of the known presses lies in that the processing capacity, owing to the construction of said presses, is primarily determined by the size of the press container, this generally precluding the possibility of adapting the processing capacity in an existing press. However, the choice of the press size and the number of presses used represent a decisive component part of the economic feasibility consideration when calculating the size of a processing plant, and so the processing capacity of a press should ideally be adapted as well as possible to the occurring quantity of pressed product to be processed. The interaction of processing type, supplied quantity, duration and type of the pressing cycles, pomace discharge, cleaning and space requirement is to be adapted exactly to the desired current and future requirement of an establishment. For example, the use of oversized presses, which can only be partially filled, leads to increased investment costs and to an increased requirement in terms of time and energy. At the same time, the consistency of the processing of the pressed product cannot be guaranteed in the case of a press which is not sufficiently filled. The utilization factor of the existing presses moreover varies owing to the incoming quantities of pressed product, which vary due to the weather for example, and so small quantities can advantageously only be processed using smaller presses, this requiring the use of different press sizes.

Moreover, expansions of the pressing capacities are in most instances only possible by using additional presses, this in some instances leading to significant changes in terms of buildings and to associated costs.

The disadvantage that a plurality of press sizes are required for different processing quantities/varieties furthermore leads to a lower utilization factor or even to processing bottlenecks because the process of harvesting the pressed product, being governed by nature, cannot be controlled in a sufficiently accurate manner.

SUMMARY OF THE INVENTION

Accordingly, it is an object of the present invention to provide an assembly which avoids the above-described shortcomings of the prior art.

This object is achieved according to the invention by an assembly as claimed.

It is a further object of the invention to specify a method for pressing liquid-containing substances, in particular grapes and fruits, using such an assembly.

This object is achieved by a method as claimed.

Yet another object lies in specifying a novel use for a mobile press container used in the assembly.

This object is achieved by the use as claimed.

The assembly according to the invention comprises inter alia the following components:
  a few mobile standardized pressure containers preferably in short-cylindrical, cuboid or approximately spherical shape, which are easy to move and have an ideally low basic specification which preferably comprises only the membrane, a drainage element, and the filling and discharging opening,
  a turning installation for carrying out the required rotating movement of the press containers during the pressing procedure, the discharging procedure and the cleaning procedure,
  preferably a central media supply for the supply of compressed air, negative pressure, and control air.

An increased output is achieved by the use of a plurality of modules, i.e. a plurality of turning installations in conjunction with a multiplicity of mobile press containers which are able to be used therein.

Herein, a "module" hereunder is referred to as the unit for processing grapes (filling, pressing, discharging, cleaning) having the following component parts:
  one or a plurality of rotary receptacles having in each case one media coupling having a variable number of mobile press containers, storage containers and transport containers, which hereunder are also referred to as turning installations,
  one or a plurality of drive units for driving the turning installations,
  a central controller for controlling the apparatuses and valves in the respective processing phases,
  one or a plurality of juice supply units per press container at a fixed location (juice collection container or pipe outlet),
  one or a plurality of apparatuses for providing the required pressure gradient (positive pressure/negative pressure).

The following advantages are derived by using the assembly according to the invention:
  fastest possible start of a pressing program
  fastest possible discharging
  quality improvement as a result of an optimum filling quantity
  better utilization of the drive and supply unit
  lower requirement for electric power
  higher operational reliability as a result of using standardized elements
  continuous operation using a sufficient number of pressing members is possible maceration and temperature control is also possible in smaller quantities and at different locations of a processing establishment mobility and use of the mobile press container
- as a collection container in a vineyard, which is filled directly during harvesting and thereafter is loaded onto a transport trailer for example by means of a tractor with a front loader,
- as a container for storing wine, preferably after pressing and prior to filling into bottles,
- as a fermentation tank,
- as a container for directly filling fermented red wine mash,
- as a pressure container which can be used for providing compressed gas.

As has been recognized by the applicant, relatively small mobile press containers which are of a standardized embodiment, and may have a capacity between 400 l and 4000 l for example, enable an immediate and optionally permanent utilization of the pressing capacity without harvest planning and knowledge pertaining to the anticipated daily quantity, because the grapes can be processed immediately after delivery according to a fixed rhythm. A further advantage lies in that the delivery process does not have to be interrupted as a result of a continuous operation being possible.

According to the invention, a core concept of the assembly according to the invention lies in dismantling the system of a non-releasable unit of frame, press container and energy supply, on which the known grape presses are based, so as to form individual systems.

This results in an assembly according to the invention for pressing liquid-containing pressed product, which comprises the following components:
- at least one mobile press container, the container interior of which is subdivided by a press membrane into a pressurized medium chamber and a pressing medium chamber (product space), wherein a filling and discharging opening which is able to be closed in a pressure-tight manner and by way of which liquid-containing pressed product is able to be filled into the pressing medium chamber is disposed in the press container, and wherein at least one preferably flexible drainage element is disposed in the pressing medium chamber, the interior of said drainage element communicating with a juice outlet of the press container by way of which liquid juice is able to be supplied to a juice collection container during a pressing procedure. If desired, the mobile press containers can also be used after the pressing procedure for storing and for transporting the grapes, the liquid juice, or wine.

The assembly according to the invention furthermore comprises a turning installation in which the mobile press containers are temporarily received and, during a pressing procedure, from a filling position is rotatable about a rotation axis by an angle of in each case less than 360°, in particular by less than 270°, in mutually opposite rotation directions.

In one preferred embodiment of the invention in which the forward and backward rotation can be performed without the use of an expensive rotary feedthrough which is complex to clean, the assembly comprises a flexible hose which during the pivoting of the press container is fluidically connected permanently to the mobile press container and the juice collection container so that the mobile press container can be rotated in the above-described limited angular ranges in the turning installation, while the flexible hose is connected to the juice outlet on the container and a fluidic connection to the juice collection container which is separated from the ambient air is established by way of the hose. This includes that the flexible hose by way of the downstream end thereof is connected to a connector block or generally to a central coupling element, which may be received so as to be fixed to the frame on the turning installation, for example, and which per se is connected to a central juice collection container into which the liquid juice is directed.

Apart from the flexible hose, the compressed air and/or vacuum supply lines and also the data lines and electrical supply lines for sensors and actuators which are optionally disposed on the press container are preferably also connected to the turning direction by way of the central coupling element and during pressing are fixed permanently to the rotating press container. The central coupling elements, or connector blocks, furthermore make it possible that the connection to the container can be rapidly disassembled when using the mobile press containers as transport or storage containers. Overall, as a result of using the above-described central coupling element, the rotary feedthroughs for the operating media (compressed air, power, signal on the container) and the product discharge (juice) can thus advantageously be dispensed with.

As a result of the rotation of the mobile press containers, or the receptacles for the latter, in the turning installation being limited to preferably 180°+approx. 45° in the one rotation direction and 180°−45° in the opposite rotation direction during the pressing procedure, this furthermore results in the possibility of a highly efficient loosening of the pressed product between two pressing procedures, on the one hand, and of sufficiently low stressing of the flexible hose during the forward and backward rotation of the mobile press containers in the turning installation, on the other hand, as a result of which the service life of the flexible hoses, which can be composed from a rubber-type, preferably woven fabric-reinforced, foodstuff-compatible material, for example, and also of the other supply lines is advantageously increased. The rotation angle is preferably delimited by detents, as a result of which a well-defined rotation angle is predefined when using electric motors or other electric actuating drives or pneumatic actuating drives.

The supply of energy and media required for each container takes place according to the invention likewise by way of the turning installation, in particular the connector block received on the latter, in a manner analogous to the discharge of the juice by way of the flexible hose.

After being coupled to the turning installation by way of an easily releasable connection, in particular a connection adapter which in the manner of a quick-release coupling is able to be connected to the connector block, the mobile press container or containers remain connected to the juice collection container, or a compressed air source or optionally also a vacuum source, at least by way of the flexible hose during the entire filling, pressing, discharging and cleaning procedure. The positive pressure sources and optionally vacuum sources for supplying a plurality of turning installations cannot only be embodied in a centralized and locationally fixed manner here, but a dedicated positive pressure/vacuum source can alternatively be disposed on each turning installation, this being advantageous in particular in an embodiment of the turning installations as mobile units. It can be particularly advantageous here for the pressurized medium chambers of a plurality of mobile press containers, which are used next to one another in individual mobile turning installations or in a common turning installation for simultaneously receiving a plurality of mobile press containers, for example, to be able to be connected to one another by way of connection lines and valves connected therebetween. This results in the possibility that after a first pressing procedure in a first mobile press container, the compressed air situated in the pressurized medium chamber of the latter can be introduced directly into the pressurized medium chamber of an adjacent second press container so as to impinge the membrane therein with compressed gas for a pressing procedure to be carried out, without this having to be generated in an energy-consuming manner by a compressor or a blower. Significant energy costs for providing the compressed gas can be saved as a result.

The compressed gas located in the pressurized medium chamber of the second mobile press container, after the subsequent pressing procedure in which generally additional compressed gas/compressed air at an elevated pressure is blown into the second pressurized medium chamber, can again be redirected into the pressurized medium chamber of the first mobile press container by way of the connection line by alternately opening and closing the valves, once said pressure container in the meantime has been set in rotation for loosening the pressed product and is ready for the next pressing procedure.

Furthermore, the drive devices for rotating the mobile press containers in the turning installations can be embodied such that one or a plurality of containers within a turning installation can be set in rotation by one or a plurality of drive apparatuses, and specifically preferably in a mutually independent manner such that each mobile press container inserted in the turning installation can be rotated individually in the one direction or the other in a manner corresponding to the predefined sequence of rotating and pressing procedures, or of the final discharging procedure.

Provided according to the invention for controlling the drive devices and also the compressed gas/vacuum sources and the other actuators and sensors is a central control installation, the sensors which detect the rotation angles of the mobile press containers during the pressing procedure, and also the pressure in the pressurized medium chamber, the temperature and other process parameters, preferably also being connected to said central control installation. The control installation is advantageously embodied as a programmable logic controller (PLC).

In one preferred embodiment of the assembly, the mobile press containers are able to be inserted into a dedicated mobile turning installation in which said mobile press containers are individually rotated so as to carry out the predefined process steps during the pressing. The insertion of the mobile press containers here can take place with the aid of a forklift truck or a front loader for example, the lifting forks thereof being introduced into two receptacle openings disposed on the base of the mobile press containers so as to slide the containers, upon loading with pressed product, preferably laterally into a corresponding receptacle frame of the turning installation in which said press containers are secured by corresponding mechanical securing means, for example by a crossbar which is to be hooked into corresponding receptacles of the frame of the turning installation.

This embodiment is distinguished in that the turning installation, after the mobile press container filled with pressed product has been inserted in the locationally displaceable turning installations and after the media lines have been connected, in particular the flexible hose to the juice collection container, is moved from the filling position to the pressing position, from the latter to the discharging position, and thereafter to the cleaning position. In the process, all mobile press containers can be filled at a fixed position, and a linear-horizontal or linear-ascending or horizontal-circular movement of the container or containers, conjointly with a turning installation, to the next position takes place after the filling. Optionally, the containers can also be retrieved from the turning installation and be moved to the next position by means of a forklift truck or the like.

After carrying out a pressing procedure, the mobile press containers (conjointly with or without a turning installation) are moved to a fixed discharging position and at the latter discharged onto a conveyor belt running below the containers, for example, in that the cover for closing the filling and discharging opening is opened and the container in the turning installation is rotated so far that the filling and discharging opening, which is at the top during the filling procedure, is disposed on the lower side.

After the discharging, the mobile press containers conjointly with or without a turning installation are moved to a cleaning position, and the interior of each container is cleaned by means of a spray installation or the like. After the cleaning, the containers then conjointly with or without the turning installation are moved back to the filling position, at the latter they are rotated to the upright filling position with the filling and discharging opening at the top and filled from above with fresh pressed product.

The preferred embodiment of the mobile press container, which can in particular be used as a storage and transport container, or as a pressurized storage container, is embodied so as to be ideally spherical. This press container can have a short-cylindrical shape, or alternatively a cuboid or pure spherical shape. A further alternative embodiment of the mobile press container, which has a cross section which is oval in the plan view and has convex lateral walls, has the advantage that this embodiment in terms of production can be assembled in a particularly simple manner from only four individual wall components bent into shape, the lateral peripheries thereof in the manner of convex rhombi converging toward the centers of the convex lateral walls and for generating the bulged rhombus-type structure being welded along the mutually adjacent lateral peripheries. As has been recognized by the applicant, these last-described embodiments have the advantage that the three-dimensional introduction of the compressive force onto the respective component parts of the press product is improved. According to a further concept on which the invention is based, it can be provided that the pressed product is pressed by a combination of a negative pressure acting on the pressing medium chamber (product space) and a reduced positive pressure of less than 0.5 bar, the latter being supplied to the pressurized medium chamber.

The advantage of this embodiment lies in that the pressure equipment directives apply only from a positive pressure of at least 0.5 bar, whereas there are no directives in most countries for impinging pressure containers with a negative pressure, and so the containers no longer have to be checked at regular intervals in terms of the regulatory pressure tightness required.

Moreover, in a further embodiment of the invention it can furthermore be provided that the press container for pressing the pressed product is impinged with a combination of negative pressure and positive pressure.

Such an embodiment is distinguished in that the mobile press containers of the assembly according to the invention are clad with a liquid-tight membrane which subdivides the respective container into a pressurized medium chamber and a pressing medium chamber, one or a plurality of drainage elements being located within the latter. As opposed to the membrane presses according to WO 03/035381 A1 mentioned at the outset, the pressure differential between the pressurized medium chamber and the output side of the drainage element required for pressing the pressed product is established by a combination of positive pressure in the pressurized medium chamber and negative pressure at the output site, or in the interior of the drainage element. The pressurized medium chamber here is advantageously impinged with a typical maximum pressure (in relation to the atmosphere) of less than 0.5 bar; and the interior of the drainage element or elements, or the juice outlet or outlets, are impinged with a typical negative pressure of −0.5 bar to −0.9 bar such that overall a typical maximum pressure differential of approx. 1.2 to 1.4 bar is established, which bears on the press membrane.

As a result of this combination of a positive pressure of less than 0.5 bar in the pressurized medium chamber and a negative pressure of up to −0.9 bar in the pressing medium chamber, or within the drainage element, there is the possibility of manufacturing the mobile press containers of the assembly according to the invention, which can also be used as transport or storage containers, from plastics material or another non-metallic material, or else a combination of such materials. As a result, the manufacturing costs can be significantly reduced and the periodically occurring significant costs for pressure testing are avoided, the latter for example in the Federal Republic of Germany being required in the case of pressure containers which have to withstand pressures of more than 0.5 bar.

One possible embodiment of such a pressure container made from plastics material, which for transport is received in a metal frame, are so-called IBCs ("intermediate bulk containers"). These comparatively cost-effective containers typically have a volume between 500 l and 3000 l and are suitable for use as previously described pressure containers, as has been recognized by the applicant.

A further advantage which results from this embodiment of the invention lies in that the actual press container is not impinged with negative pressure by the press membrane which closes off the pressing medium chamber, i.e. the space in which the pressed product is received. As a result, the pressure containers, or mobile press containers, in the assembly according to the invention, when said containers are made from metal, can advantageously be embodied with smaller wall thicknesses, this again reducing the manufacturing costs.

A further embodiment of such an assembly according to the invention having a press container made from simple plastics material, as is used for plastics drums, for example, comprises a drum-shaped mobile press container made from plastics material, which in a manner similar to the above-described press container made from plastics material is received in a support frame having circumferential reinforcement or support rings from metal as alluded to. Achieved as a result is a sufficient pressure resistance of the drum-shaped press container which withstands a positive pressure of at most 0.5 bar. The drum-shaped or cylindrical container, which can be embodied not only as a mobile press container but also as a storage container for the pressed product or the juice, for example, by way of the reinforcement rings, or else by way of support flanges on the end side, is supported on four or more rollers of a support frame of a turning installation, preferably one of said rollers being composed of a rubber-elastic material and being driven by way of a motor so as to rotate the press container preferably by the drive motor in the one or other direction during a pressing cycle once said press container has been filled with pressed product. Furthermore, the reinforcement rings by way of coaxial bars can be connected so as to form a basket-type support frame.

The preferably used flexible hose for discharging the liquid juice, in this embodiment by way of the upstream end thereof, is connected to the juice outlet for example by way of a known flange connection, wherein the flexible hose at the same time also contains the compressed air supply line and the vacuum supply line and optionally sensor and electrical lines which are conjointly connected, automatically so to speak, when closing the flange connection. The other downstream end of the flexible hose, which in the forward and backward rotation of the container is circumferentially wound along a hose winding path which is disposed coaxially with the longitudinal axis of the cylindrical press container and which is advantageously formed on one of the support flanges on the end side, is connected to a connector block or generally to a central coupling element, the latter—as already described above—being able to be received so as to be fixed on the frame on the turning installation, for example. The central coupling element per se can be connected to a central juice collection container into which the liquid juice is directed. Apart from the flexible hose, the compressed air and/or vacuum supply lines and also the data lines and electrical supply lines for sensors and actuators which are optionally disposed on the press container are preferably also connected to the turning installation by way of the central coupling element and during the pressing are fixed permanently on the rotating press container.

The support or reinforcement rings of the mobile press container, which alternatively can also be made from a flexible material, in particular from a pressure-resistant and tear-resistant plastic film or tarpaulin reinforced by a woven fabric, apart from the support and stabilizing function thereof, can simultaneously or alternatively also serve as a running surface, the rollers on which the container rotates running along said running surface. As a result, there is the possibility of supporting the container by further rollers in the center, this also enabling the use of larger mobile press containers having a length of, for example, 5 m, which are inserted into the turning installation.

The press container of reduced pressure resistance according to a further embodiment furthermore has a cylindrical shape having two diametrically opposite flattened circumferential portions in which the filling and discharging opening and the juice outlet are disposed. As a result of this design embodiment of the pressure container, which is made possible only by the simultaneous combination described above of negative pressure of up to −900 mbar in the pressing medium chamber and positive pressure of less than 0.5 bar in the pressurized medium chamber, the advantage is derived that the container volume which can be utilized as a product means space is enlarged at a predefined diameter of the cylindrical container of reduced pressure resistance. The reason therefor lies in that the additional height requirement for the juice outlet and the flange of the filling and discharging opening, which advantageously can be integrated in the circumference of the container and is otherwise required in pressure containers which in the cross section, with the exception of the juice outlet and the filling and discharging opening, always have to be circular in order to be able to absorb the high compressive forces, can be dispensed with. It is particularly advantageous here for the juice outlet to be formed directly below the flattened circumferential portion. A juice outlet channel, which in the disposal of a plurality of drainage elements in the interior of the press container ensures a juice outlet to the centrally disposed juice outlet port, can be delimited toward the external side by an attached cylinder circumferential segment which extends parallel to the cylinder longitudinal axis.

One possible embodiment for receiving and locking a mobile (pressure-resistant) press container described at the outset of the assembly according to the invention in a turning installation provides that the mobile press container has suitable holding elements which can be embodied as tabs or holding eyelets, for example, which enable said mobile press container to be inserted into the turning installation using a suitable lifting gear and the container to be subsequently locked in the turning installation. It is likewise possible for two parallel guide rails to be provided on the turning installation, on which the mobile press container by way of corresponding lateral tabs or complementary sliding elements can be pushed laterally into the terminal position in the turning installation, for example by means of the lifting forks of a forklift truck which are able to be introduced into an opening in the base portion of the mobile press containers.

In a further embodiment of the invention, it can furthermore be provided that the filling and discharging opening is able to be closed by a pivotable cover, the end of a central drainage element disposed below the opening being fixed to the swivel axle of said cover. This embodiment is distinguished in that the rotatable fixing of the central drainage element to the swivel axle of the pivoting cover permits the pivoting cover to be opened without having to first disassemble the drainage element.

A seal, which is composed of a simple ring made from elastic material, which is pushed onto a circular element (U-profile) and when closing the cover bears on the wall of the cover opening on the container can be provided for sealing the pivotable cover which on the one side of the swivel axle is moved into the filling and discharging opening, and on the opposite side is moved out of the latter. As a result, by providing a minor eccentricity of the rotation axis, the cover when using positive pressure in the product space is advantageously pushed in a self-reinforcing manner onto the seal, or a detent formed on the press container, this enabling reliable sealing of the press container without additional complex locking and contact pressure means. To this end, the swivel axle can optionally be slightly offset in relation to an imaginary symmetry axis of the cover, said symmetry axis in the case of a closed cover extending parallel to the swivel axle, such that the face of the cover which is pivoted into the container interior is larger than the face of the cover which is moved out of the container interior when opening the cover.

In other words, the assembly according to the invention is distinguished in that a cover for closing the filling and discharging opening is received on the press container so as to be pivotable about a swivel axle that extends parallel to the face of the cover, and in that the end of the drainage element that lies opposite the juice outlet is rotatably fastened to the axle in such a manner that the end of the drainage element which is fastened to the axle substantially remains in the spatial position thereof in the interior of the press container when the cover is pivoted about the swivel axle.

According to a further embodiment of the assembly according to the invention, a vacuum-free juice collection container can furthermore be used. To this end, the rotatable mobile press container, after insertion into the turning installation after coupling the central coupling element to the flexible hose, is connected to a juice collection container which is disposed above the mobile press container into which the juice exiting the juice outlet is pumped with the aid of a pump, preferably a hose pump or a peristaltic pump. The use of such a hose pump has the advantage that the latter per se is not contaminated by the sugar-containing juice, and the hose portion on which the pump known per se mechanically acts can be easily cleaned. Moreover, hose pumps of this type are advantageously self-priming, have a sufficient suction height of up to 9.5 m, and can build up a negative pressure of −950 mbar in relation to the atmosphere.

In this last-described embodiment, the pressurized medium chamber is impinged with a positive pressure of at most 500 mbar by way of which the pressed product is pushed against the drainage elements. As a result of the negative pressure generated by the pump, the liquid juice is additionally suctioned from the interior of the drainage element and by the correspondingly controlled pump conveyed into the vacuum-free juice collection container from which the juice can then be retrieved by gravitation or a further pump.

Furthermore, a negative pressure can thereafter be generated by further pumping, so as to in a subsequent pressing procedure, after loosening and repositioning the residual product remaining in the pressing medium chamber, further press the juice contained therein by a combination of negative pressure generated by the pump and positive pressure of less than 0.5 bar prevailing in the pressurized medium chamber.

In other words, this embodiment of the assembly according to the invention is characterized in that the product discharge can take place by means of the pump, owing to the permanent coupling between the mobile press container and the stationary juice collection container, as described above, said pump simultaneously generating the negative pressure required for reaching the overall pressure gradient required, wherein the necessary separation of product and volumetric vacuum flow takes place within the pump. As a result of the use of a hose pump, there is the additional advantage that the required volumetric pump flow is relatively minor owing to the preferably used combined pressing using negative pressure and positive pressure.

As an alternative to a hose pump, a double membrane pump can be used, the suction side thereof at a location above the liquid level impinging the in this case vacuum-resistant juice collection container with negative pressure which by way of a juice inlet of the juice collection container, which is preferably likewise disposed above the liquid level, and the flexible hose and preferably one or a plurality of shut-off and branch valves is supplied to the juice outlet of the press container. The pressure side of the double membrane pump in this embodiment is particularly advantageously connected to the pressurized medium chamber by way of corresponding valves and branch lines so that the pressure side of the pump can be used for impinging the pressurized medium chamber with compressed air which can optionally be temporarily stored in a compressed air collection container, so as to use this compressed air at a later point in time for bringing the press membrane to bear.

Overall, the mobile press containers and the pump after the pressing can advantageously be used for other tasks required in the processing establishment.

As has furthermore been recognized by the applicant, the mobile press containers, when the latter are embodied as metal pressure containers, can particularly advantageously be used as temporary stores for the compressed air which is to be directed into the pressurized medium chamber during the pressing procedure. To this end, the respective pressurized medium chambers of the mobile press containers are continuously impinged with compressed air by a compressed air compressor or else a blower outside the actual pressing cycles, said compressed air compressor or blower having a significantly reduced output in comparison to the known central compressed air supply systems, which is only ¹⁄₁₀ of the usual drive output, for example. The filling of the mobile press containers by way of a compressed air line network can take place by way of a central compressor, for example, which by way of corresponding quick-release couplings and electrically activatable valves is able to be temporarily connected to the containers. By using blowers or compressors with a significantly reduced output, not only can the costs for the blowers be reduced but the compressed air required for the pressing procedures can moreover be obtained more efficiently because the adiabatic losses are reduced.

A further advantage of the last-described embodiment lies in that the mobile press containers which have been filled with compressed air overnight, for example, can be transported to the vineyard so as to there impinge with compressed air a container already filled with pressed product. This results in the possibility of already pressing part of the grape juice in advance on site, if desired, so as to save the time for transporting the grapes and to avoid the grapes being stressed during transportation. This may be desirable in some instances in the case of high-value wines in order for the quality to be further enhanced.

BRIEF DESCRIPTION OF THE FIGURES

The invention will be described hereunder with reference to FIGS. 1 to 9 by means of preferred embodiments. In the drawings.

DETAILED DESCRIPTION OF THE INVENTION

Figure 1:
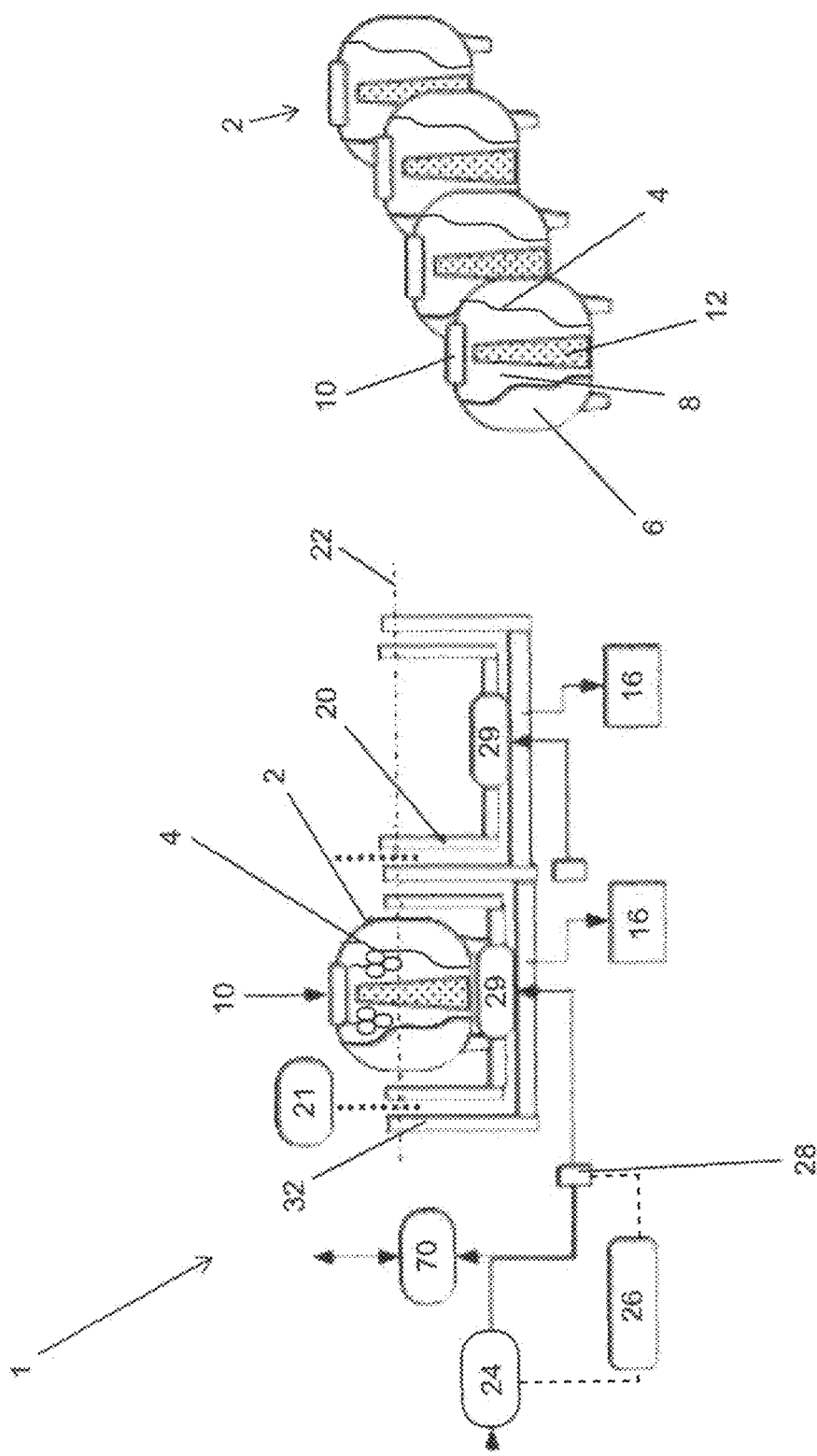
FIG. 1 shows a schematic illustration of the assembly according to the invention.

As is indicated in FIG. 1, an assembly according to the invention which is shown by way of example comprises a mobile press container 2, the container interior of which is subdivided by a press membrane 4 into a pressurized medium chamber 6 and a pressing medium chamber 8. The press container 2 is closed by a filling and discharging opening 10 which is able to be closed in a pressure-tight manner and by way of which liquid-containing pressed product is able to be filled into the pressing medium chamber 8. At least one drainage element 12 is disposed in the pressing medium chamber 8, the interior of said drainage element 12 communicating with a juice outlet 14 of the press container 2 by way of which liquid juice is able to be only supplied to a juice collection container 16 during a pressing procedure. The press container 2, for the rotation required for a pressing procedure, is received in a turning installation 20. The press container 2, during a pressing procedure, from a filling position is rotatable by the turning installation 20 about a rotation axis 22 by an angle of in each case less than 360°, in particular by less than 270°, in mutually opposite rotation directions.

As is likewise illustrated in FIG. 1, the turning installation 20 comprises a drive 21 for rotating the mobile press container 2. Said drive 21 can be embodied as an electric motor or as a compressed air cylinder or water cylinder. Moreover, the turning installation 20 comprises a compressed gas source 24, in particular as a compressed air source, and a control installation 26 for controlling the drive 21 and/or the compressed gas source 24, or a valve 28 which is connected to the compressed gas source and by way of which the supply of compressed gas into the pressurized medium chamber 6 is variable. The pressurized medium chamber 6 for pressing the pressed product is preferably configured to be impinged with a positive pressure of less than 0.5 bar. In this way, cost-intensive testing of the press container is dispensed with, because pressure containers for positive pressures of more than 0.5 bar have to be subjected to regular testing according to the pressure equipment directive. It is furthermore provided in this case that the assembly 1 comprises a vacuum source 70 by way of which the interior of the drainage element 12 for pressing the pressed product is able to be impinged with a negative pressure between 0 bar and −950 mbar.

Figure 2:
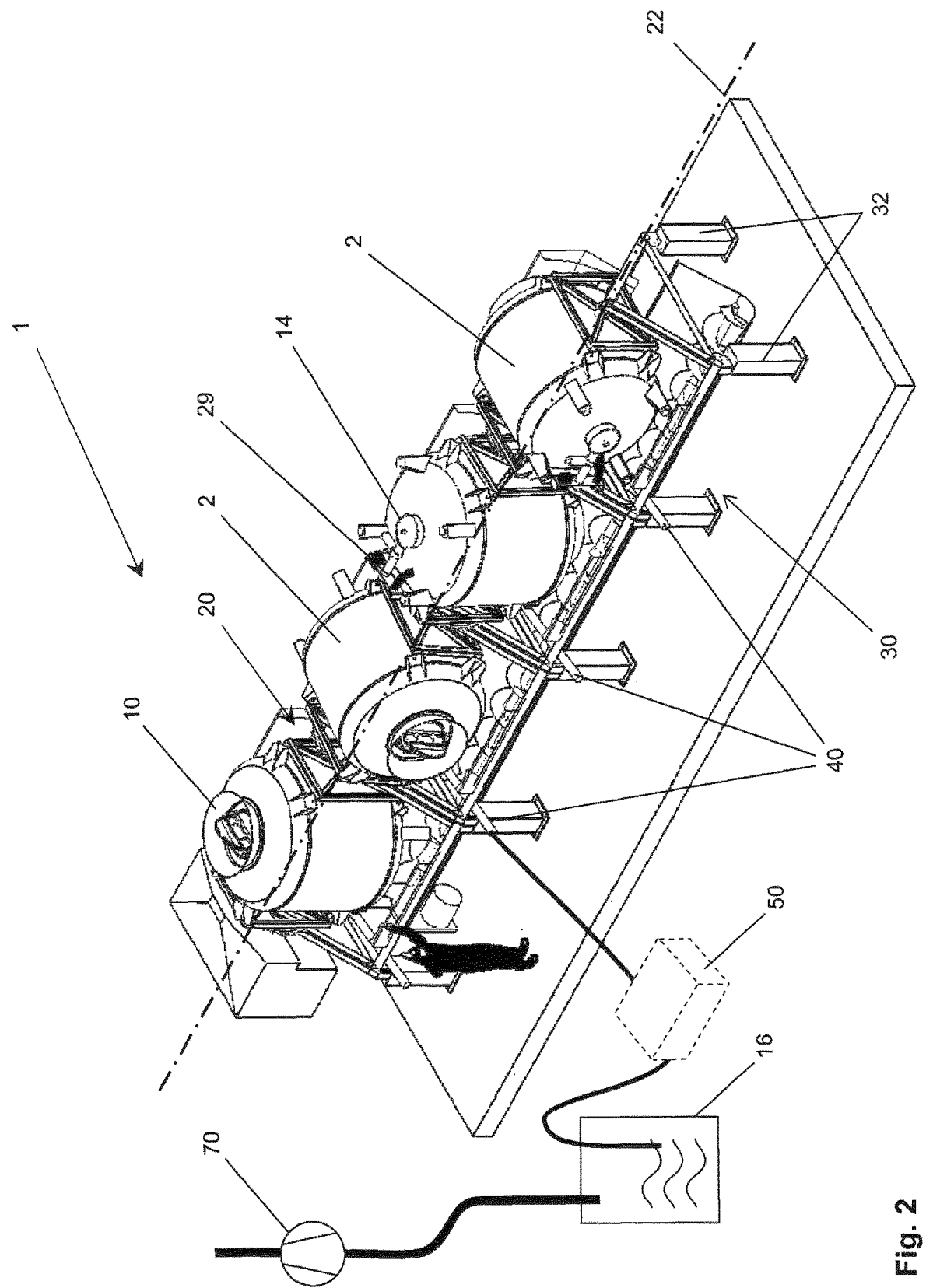
FIG. 2 shows a schematic perspective illustration of an assembly according to the invention comprising four press containers.

In one preferred embodiment, the turning installation 20 has two or more receptacle spaces 30 for temporarily receiving simultaneously at least two mobile press containers 2, wherein each receptacle space 30 is configured to rotate a mobile press container 2 received temporarily thereon in each of the two rotation directions. FIG. 2 shows a schematic illustration of an assembly 1 according to the invention having four receptacle spaces 30 for the mobile press containers 2. The mobile press containers 2 here are in each case illustrated in different orientations to which the latter are moved by the turning installations 20 during a pressing procedure. The container 2 on the left side of the illustration is in the filling position in which the pressed product is filled into the press container 2 by way of the filling and discharging opening 10. The second press container 2 from the left is horizontally aligned and by way of the filling and discharging opening 10 points sideways. The press container 2 during the pressing procedure is moved to this position in order to loosen and mix the pressed product in the interior and in this way to increase the juice yield after repeated pressing.

The third press container 2 from the left is in the discharging position in which the pressed product, when completely pressed, is discharged from the press container 2 by way of the filling and discharging opening 10. The juice outlet 14 on the lower side of the press container 2, by way of which the juice runs out during the pressing procedure and is collected in a juice collection container 16, can likewise be seen in this position. To this end, the assembly according to one preferred embodiment comprises a flexible hose 40 by way of which the respective juice outlet 14 during pivoting of the press container 2 in the turning installation 20 is fluidically connected continuously, preferably over the entire pressing procedure, to the juice collection container 16. The juice collection container 16 is preferably disposed above the juice outlet 14, in particular on the main frame 32 of the turning installation 20. The assembly 1 furthermore comprises a juice pump 50 for conveying the liquid juice and air located in the pressing medium chamber 8 from the juice outlet 14 into the juice collection container 16 during a pressing procedure. In one preferred embodiment, the juice pump 50 is a membrane pump or a hose pump which preferably acts mechanically on the external side of the flexible hose 40 or of a further flexible hose 41 which is connected to the latter and connects the flexible hose 40 to the juice collection container 16.

The fourth press container 2 from the left in the illustration of FIG. 2 by way of example is finally located in a cleaning position in which the interior of the press container 2 can be cleaned after or before a pressing procedure.

Figure 4C:
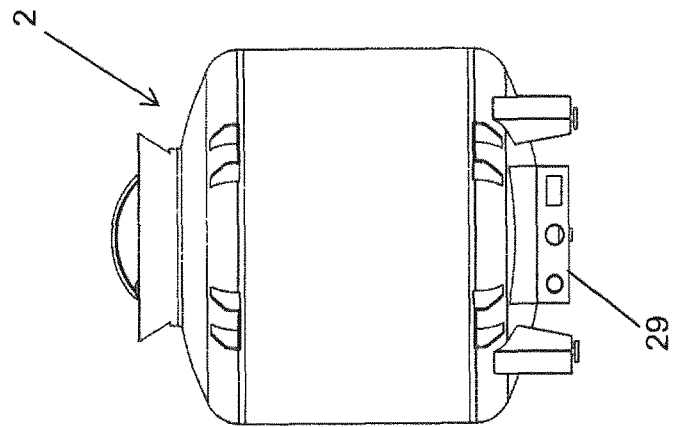
FIGS. 4a-c show schematic drawings of a further embodiment of the press container.
Figure 4B:
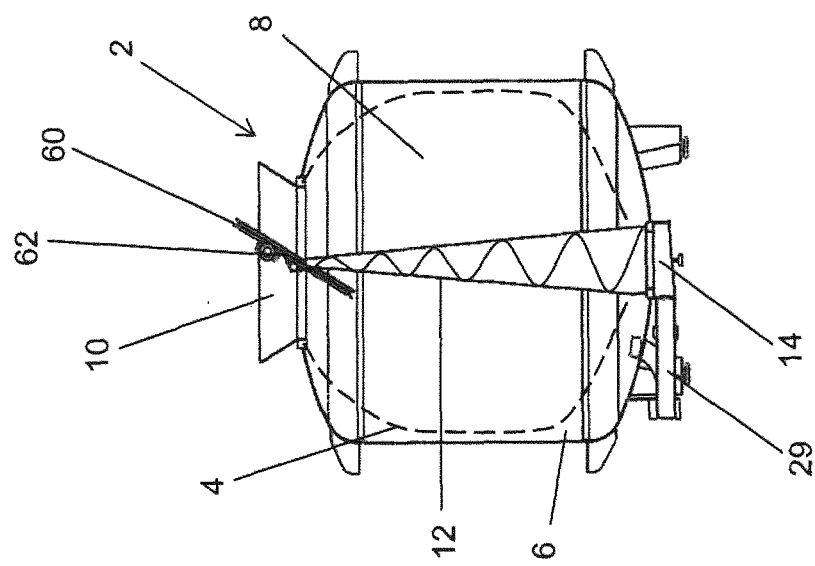

It can furthermore be provided that the flexible hose 40 and a pressurized medium hose which is connected to the compressed gas source 24, and preferably an electrical power and data line connected to the control installation 26, are able to be coupled to the mobile press container 2 by way of a central coupling element 29 indicated in FIGS. 4b and 4c. In this way, the mobile press container 2 upon insertion into the turning installation 20 as a unit is fluidically coupled to the juice collection container 16 and the compressed gas source 24, and sensors and/or electric actuators provided in the press container 2 are preferably electrically connected to the control installation 26.

In a further embodiment of the assembly according to the invention it is provided that the pressurized medium chambers 6 of the first and second mobile press container 2 received in the turning installation 20 are able to be fluidically connected to one another by way of a pressure line and valves. This connection has the advantage that after a pressing procedure compressed gas at a positive pressure from the pressurized medium chamber 6 of the first mobile press container for generating a primary pressure can be introduced into the pressurized medium chamber 6 of the second mobile press container 2.

Figure 3:
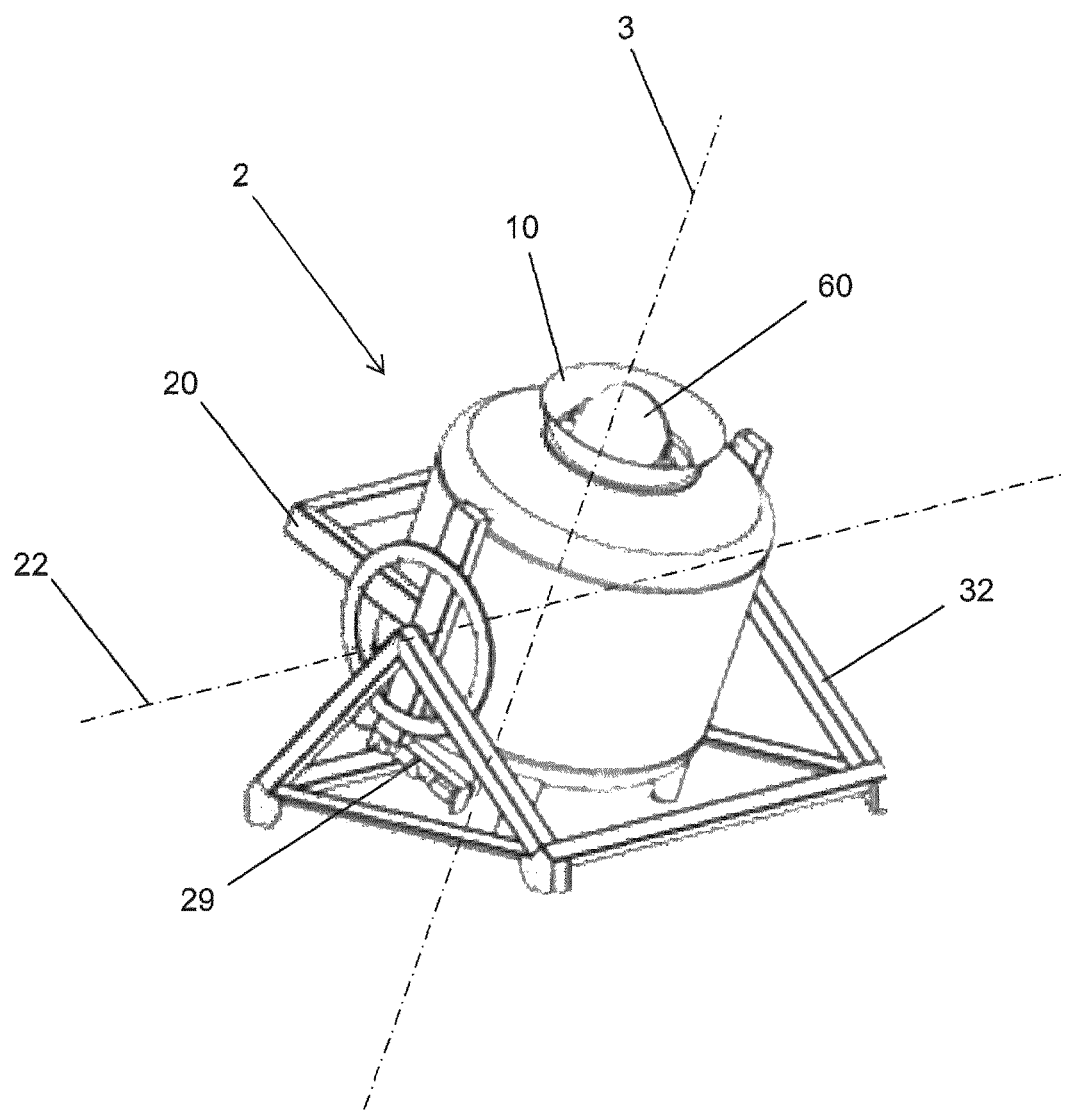
FIG. 3 shows a perspective illustration of a preferred embodiment of the press container.
Figure 4A:
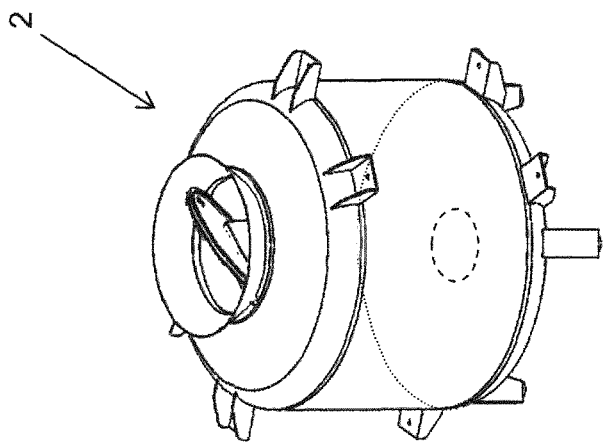

FIG. 3 shows a preferred embodiment of a mobile press container 2. The container is received in a main frame 32 so as to be rotatable about the rotation axis 22 by means of the turning installation 20. FIGS. 4a and 4b show further illustrations of the mobile press container 2 from FIG. 3. The latter is preferably embodied as a pressure container made from metal, which has a substantially spherical or short-cylindrical or cuboid shape. The filling and discharging opening 10 and the juice outlet 14 here are disposed on mutually opposite sides of the container 2. The drainage element 12 extends from the juice outlet 14 along a container vertical axis 3 to the filling and discharging opening 10, and the rotation axis 22, about which the mobile press container 2 is rotatable upon insertion in the turning installation 20, runs so as to be substantially orthogonal to the container vertical axis 3.

Figure 5:
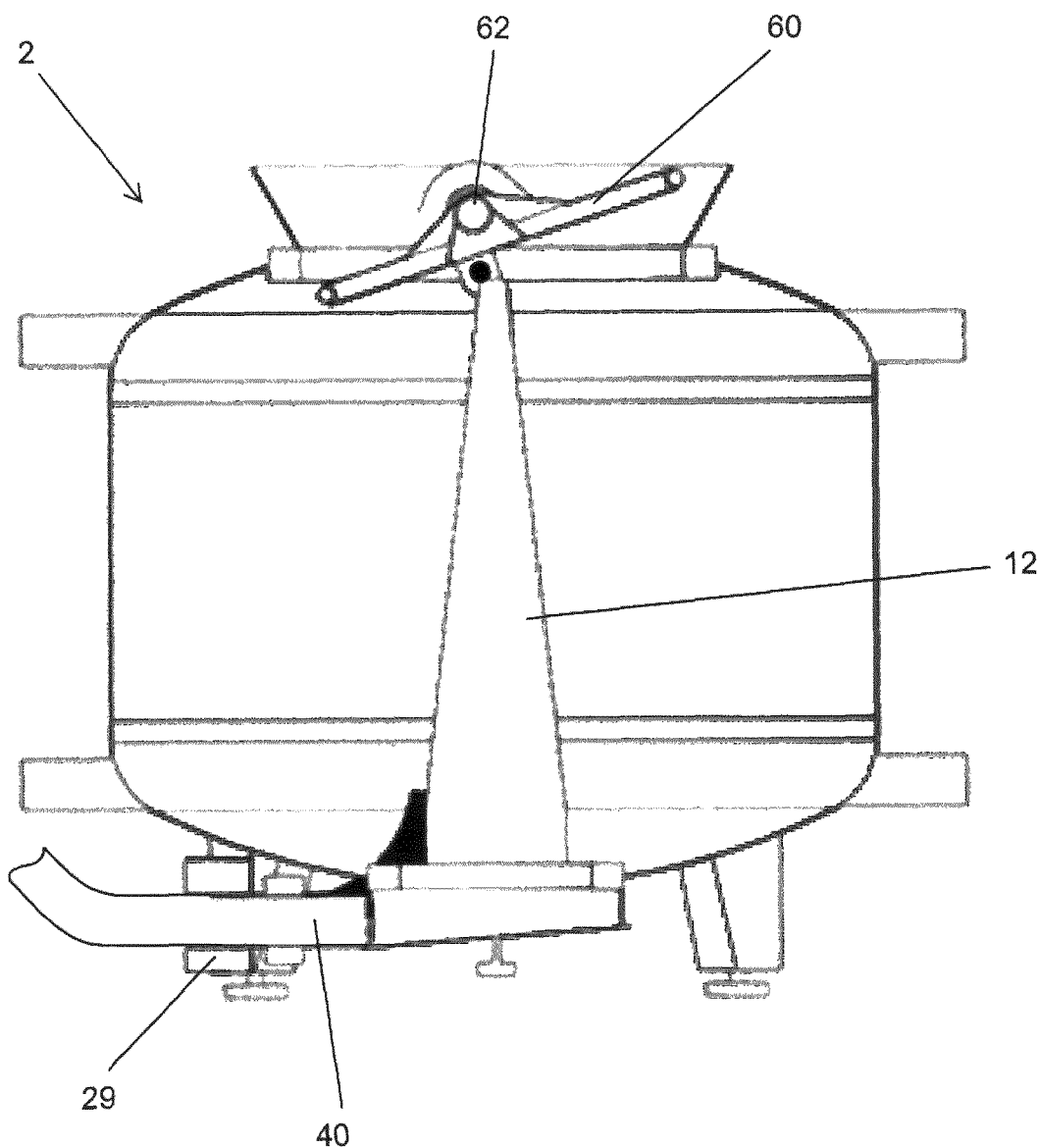
FIG. 5 shows a sectional view of the press container from FIG. 4, FIGS. 6a-d show a schematic illustration of further possible geometries of the press container according to the invention, FIGS. 7a,b show a perspective illustration of a further embodiment of the press container according to the invention.

Shown in FIG. 5 is a sectional illustration of a further preferred embodiment of a mobile press container 2 having a pivotable cover 60 and a drainage element 12 which is rotatably fixed to the swivel axle 62 of said cover 60. The cover 60, also shown in the preceding figures, for closing the filling and discharging opening 10 is received so as to be pivotable about a swivel axle 62 which extends parallel to the face of the cover 60. Moreover, the end of the drainage element 12 opposite the juice outlet 14 is rotatably fastened to the swivel axle 62 in such a manner that the end of the drainage element 12 fastened to the swivel axle 62 remains substantially in the spatial position thereof in the interior of the press container 2 when the cover 60 is pivoted about the swivel axle.

Figure 6D:
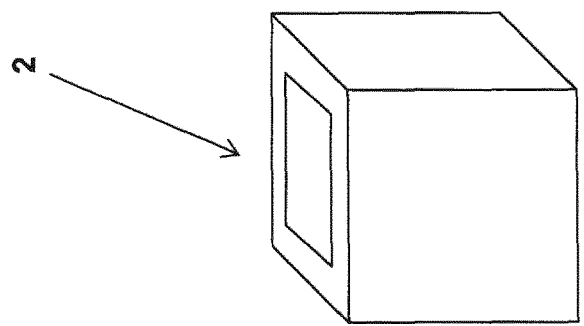
Figure 6C:
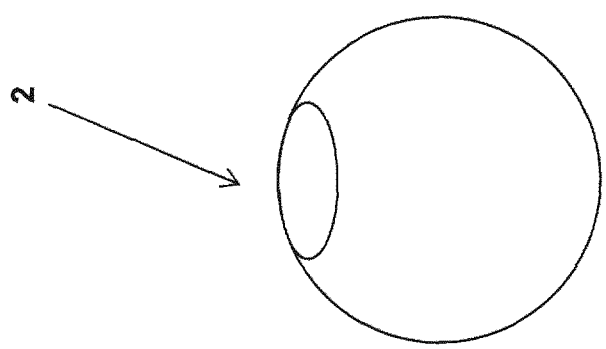
Figure 6B:
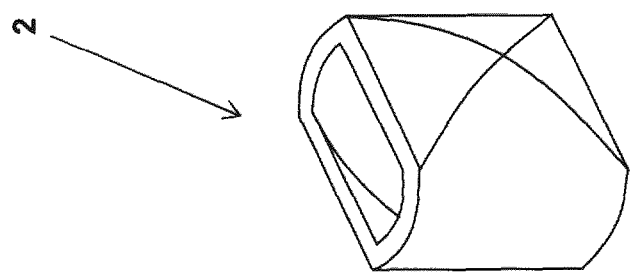
Figure 6A:
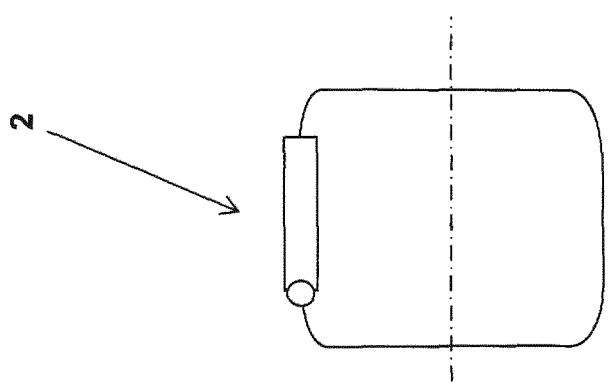

Various preferred geometries of mobile press containers 2 are illustrated in FIGS. 6a to 6d. The press container 2 can have a cylindrical shape, for example, or be spherical or cuboid. Moreover possible is a shape of the press container 2 which has a cross section which is oval in the plan view and has convex lateral walls, as illustrated in FIG. 6b. This press container 2 can be assembled from four individual wall components bent into shape, the lateral peripheries thereof in the manner of convex rhombi converging toward the centers of the convex lateral walls and for generating the bulged rhombus-type structure being welded along the mutually adjacent lateral peripheries.

Figure 7A:
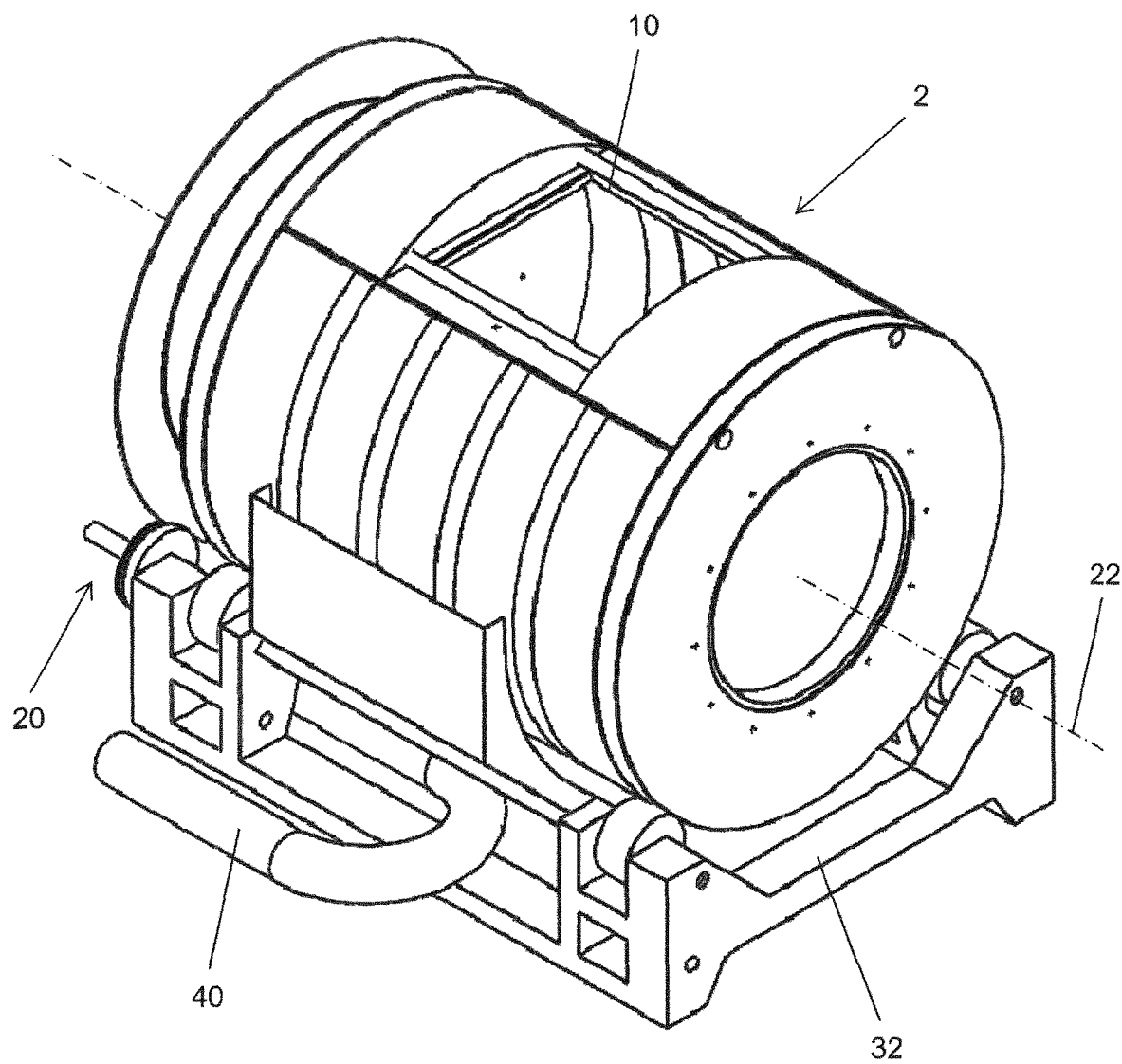
Figure 7B:
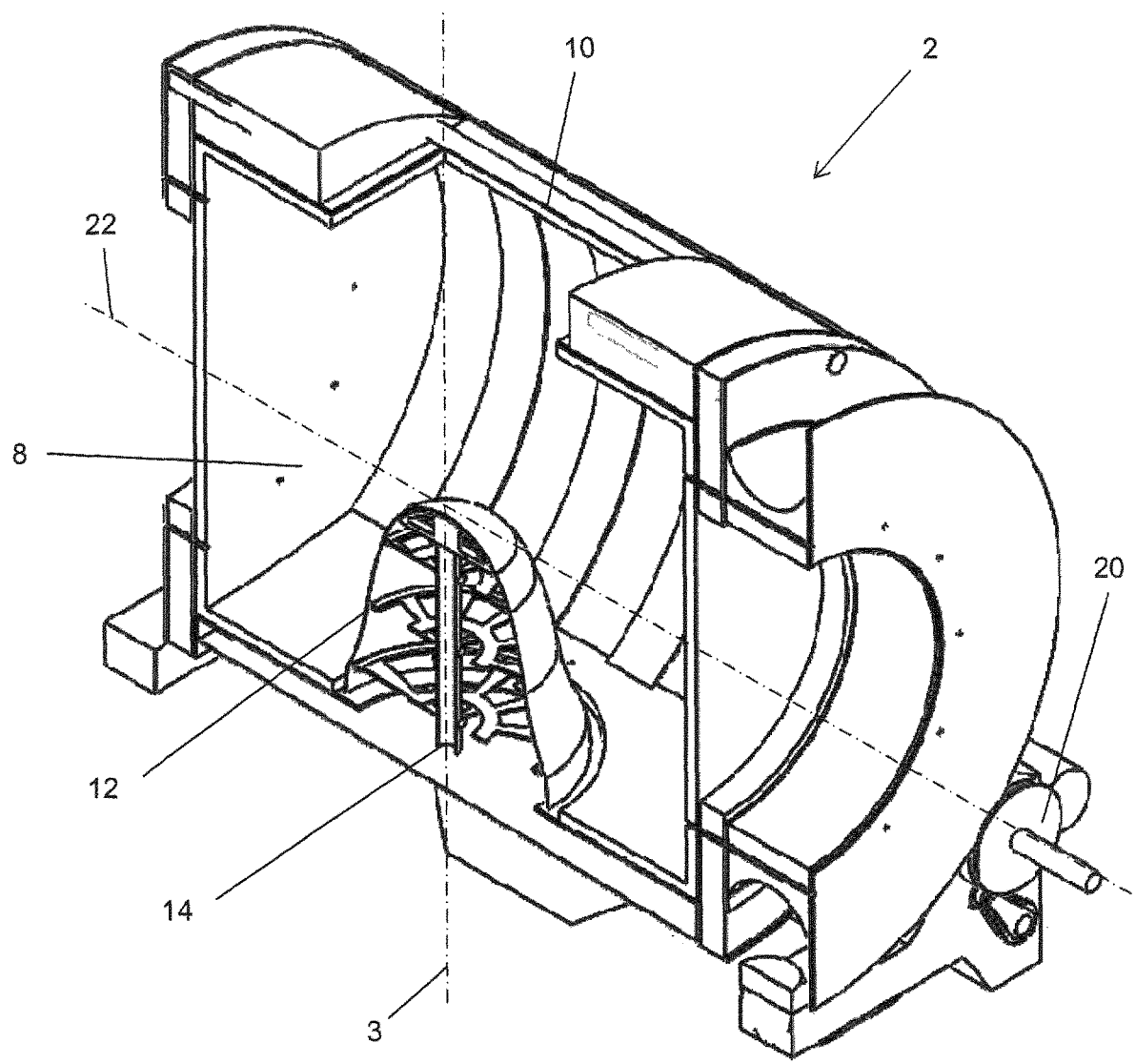

FIGS. 7a and 7b show a perspective illustration of a press container 2 according to the invention. The cylindrical press container 2 is disposed on the main frame 32 so as to be rotatable about the rotation axis 22 by means of the turning installation 20. The drainage element 12, which extends along the container vertical axis 3 and in the direction of the filling and discharging opening, is illustrated in the sectional illustration of FIG. 7b. The juice from the pressed product in the pressing medium chamber 8 penetrates the drainage element 12, which is preferably composed of a flexible woven screen fabric having a spiral disposed therein, during the pressing procedure and finally makes its way to the juice outlet 14 where said juice by way of the flexible hose 40 is directed to the juice collection container 16.

Figure 8:
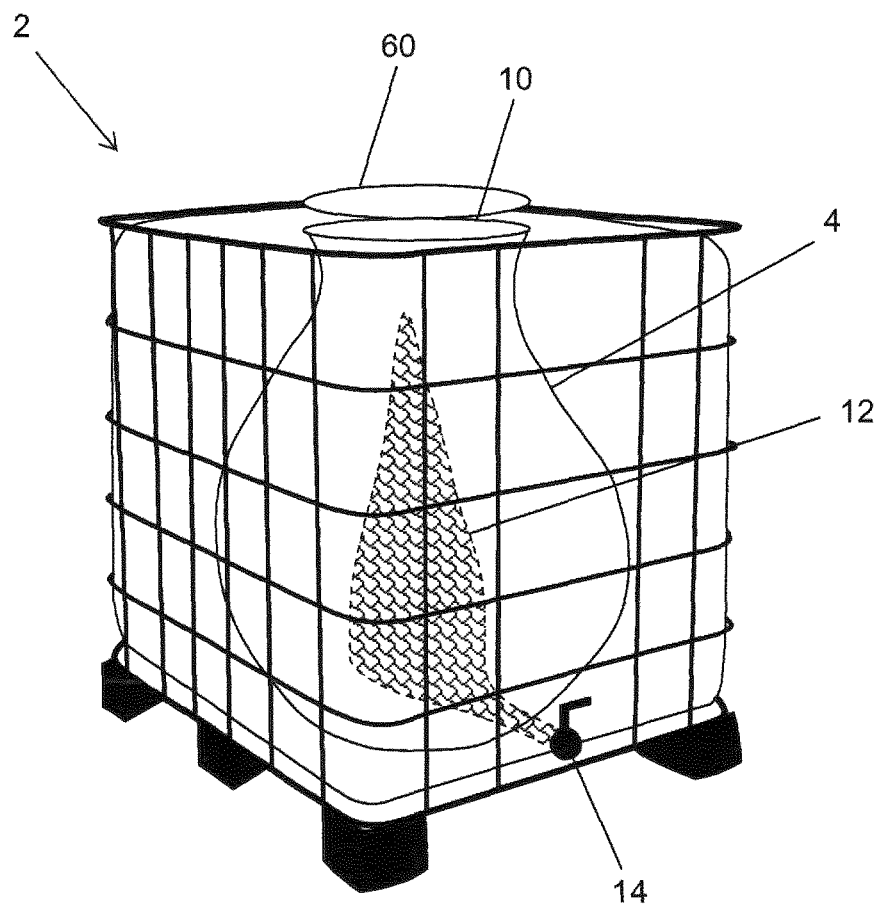
FIG. 8 shows a schematic illustration of a mobile press container made from plastics material.

FIG. 8 shows a further embodiment of a mobile press container 2. The latter is composed of a material having a reduced pressure resistance, in particular of plastics material or thin sheet metal. The press container 2 has such a wall thickness that said press container 2 is able to be impinged with an internal pressure of at most 0.5 bar. IBCs ("intermediate bulk containers") are advantageously suitable as mobile press containers because the former are cost-effective to procure and by virtue of the construction mode are easy to transport, for example with a forklift truck. In this way, the mobile press containers 2 can already be filled with the pressed product at the harvesting site, as a result of which a transfer of the pressed product and thus an additional production step is dispensed with.

Figure 9:
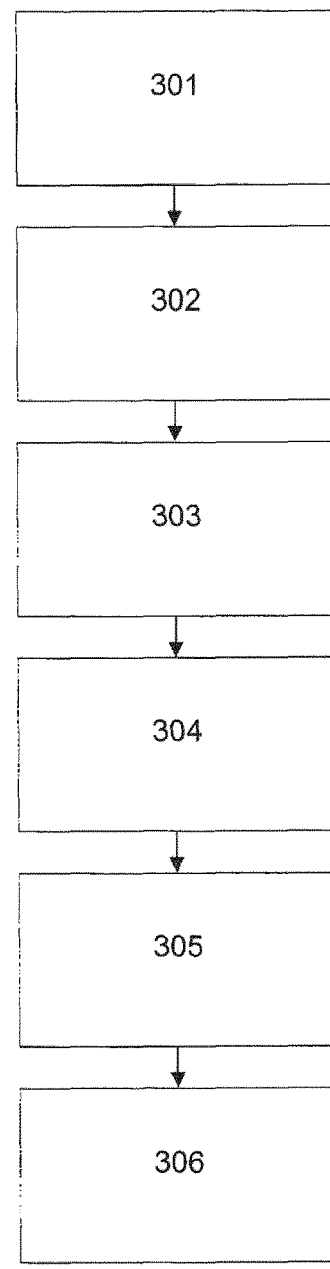
FIG. 9 shows a flow chart of the method according to the invention for pressing liquid-containing pressed product using an assembly according to the invention.

FIG. 9 shows a flow chart of the method according to the invention for pressing liquid-containing pressed product using an assembly described above. The method steps here are:

301 collecting the pressed product in the mobile press container 2 locally at the site of harvesting of the pressed product, and/or 302 transporting the pressed product in the mobile press container 2 from the site of harvesting of the pressed product to a pressed product processing establishment, and/or 303 collecting or weighing the pressed product in the pressed product processing establishment in the mobile press container 2 and/or carrying out a quality assessment, preferably 304 storing the pressed product in the mobile press container 2 for maceration and/or cooling of the pressed product for reducing the temperature in the press container, 305 transporting the pressed product in the mobile press container 2 to the turning installation 20 of the assembly 1 and pressing said pressed product in the press container 3 while rotating the latter, and/or optionally

306 transporting the pomace contained in the mobile press container 2 after the pressing procedure in the mobile press container 2 to a pomace composting plant or pomace further processing plant, and optionally collecting the juice obtained from the pressed product during a pressing procedure and storing said juice in a further mobile press container 2 and/or transporting the mobile press container with the juice contained therein to a juice further processing plant.

LIST OF REFERENCE SIGNS

1 Assembly
2 Mobile press container
3 Container vertical axis
4 Press membrane
6 Pressurized medium chamber
8 Pressing medium chamber
10 Filling and discharging opening
12 Drainage element
14 Juice outlet
16 Juice collection container
20 Turning installation
21 Drive of the turning installation for rotating the container
22 Rotation axis
24 Compressed gas source
26 Control installation
28 Valve
29 Coupling element
30 Receptacle space
32 Main frame of the turning installation
40 Flexible hose
50 Juice pump
60 Cover
62 Swivel axle of the cover
70 Vacuum source

The invention claimed is:

1. An assembly for pressing liquid-containing product to be pressed, the assembly comprising:
   at least one mobile press container having a container interior;
   a press membrane disposed to subdividing said container interior into a pressurized medium chamber and a pressing medium chamber;
   said press container being formed with a filling and discharging opening formed to be closed pressure-tight and formed to receive liquid-containing product into said pressing medium chamber;
   at least one drainage element disposed in said pressing medium chamber, said at least one drainage element having an interior communicating with a juice outlet of said press container by way of which liquid juice is to be supplied to a juice collection container during a pressing procedure;
   a turning installation configured to temporarily receive said mobile press container and, during a pressing procedure, to rotate about a rotation axis from a filling position by an angle of less than 360° in mutually opposite rotation directions.

2. The assembly according to claim 1, wherein said turning installation is configured to pivot about an angle of less than 270°.

3. The assembly according to claim 1, further comprising a flexible hose by way of which said juice outlet, during the pivoting of said press container in said turning installation, is fluidically connected to said juice collection container.

4. The assembly according to claim 1, wherein said turning installation comprises at least one of a drive for rotating said mobile press container or a compressed gas source and a control installation for controlling said drive and/or said compressed gas source or a valve which is connected to said compressed gas source and by way of which a supply of compressed gas into said pressurized medium chamber is variable.

5. The assembly according to claim 4, wherein said drive is a compressed air cylinder or water cylinder and said compressed gas source is a pressurized air source.

6. The assembly according to claim 3, wherein said flexible hose and a pressurized medium hose connected to a compressed gas source are connectable to said mobile press container by way of a central coupling element for fluidically coupling, upon insertion into said turning installation, as a unit to the juice collection container and the compressed gas source.

7. The assembly according to claim 6, which further comprises a control installation and an electric power and data line connected between said control installation and said mobile press container, and sensors and/or electric actuators in said press container connected to said control installation.

8. The assembly according to claim 1, wherein said turning installation has two or more receptacle spaces for temporarily receiving simultaneously at least two said mobile press containers, wherein each receptacle space is configured to rotate a mobile press container temporarily received thereon in each of the two rotation directions.

9. The assembly according to claim 8, which comprises a pressure line and valves for fluidically connecting said pressurized medium chambers of said two mobile press containers received in said turning installation to one another, so as to after a pressing procedure introduce compressed gas at a positive pressure from said pressurized medium chamber of one of said mobile press containers into said pressurized medium chamber of another one of said mobile press containers for generating a primary pressure.

10. The assembly according to claim 1, wherein said mobile press container is a pressure container with a substantially spherical or short-cylindrical or cuboid shape, wherein said filling and discharging opening and said juice outlet are disposed on mutually opposite sides of said mobile press container, and said drainage element extends from said juice outlet along a container vertical axis to said filling and discharging opening, and wherein said rotation axis, about which the mobile press container is rotatable after insertion into said turning installation, runs substantially orthogonally to the container vertical axis.

11. The assembly according to claim 1, wherein said juice collection container is disposed above said juice outlet, and the assembly further comprises a juice pump for conveying the liquid juice and air located in the pressing medium chamber from said juice outlet into said juice collection container during a pressing procedure.

12. The assembly according to claim 11, wherein said juice collection container is mounted to a main frame of said turning installation.

13. The assembly according to claim 11, wherein said juice pump is a diaphragm pump or a hose pump configured to act mechanically on an exterior of a flexible hose connected between said juice outlet and said juice collection container.

14. The assembly according to claim 1, which further comprises a cover for closing said filling and discharging opening, said cover being pivotably mounted about a swivel axle extending parallel to a face of said cover, and wherein an end of said drainage element opposite said juice outlet is rotatably fastened to said swivel axle such that an end of said drainage element that is fastened to said swivel axle, when pivoting said cover about said swivel axle, remains substantially in a spatial position thereof in the interior of said press container.

15. The assembly according to claim 1, wherein said pressurized medium chamber for pressing the liquid-containing pressed product is configured to be loaded with a positive pressure of less than 0.5 bar, and wherein the assembly comprises a vacuum source by way of which the interior of said drainage element is to be impinged with a negative pressure between 0 bar and −950 mbar.

16. The assembly according to claim 1, wherein said mobile press container is composed of a material with reduced pressure resistance, and said container has a wall thickness enabling said container to withstand an internal pressure of at most 0.5 bar.

17. The assembly according to claim 16, wherein said mobile press container is composed of a plastics material or thin sheet metal.

18. A method for pressing liquid-containing pressed product, the method comprising:
providing an assembly according to claim 1;
collecting the pressed product in the mobile press container locally at a site where the pressed product is harvested; and/or
transporting the pressed product in the mobile press container from the site where the pressed product is harvested to a pressed product processing facility; and/or
collecting the pressed product in the pressed product processing facility and weighing and/or subjecting the pressed product to a quality assessment in the mobile press container; and/or
storing the pressed product in the mobile press container for maceration and/or cooling the pressed product in order to lower the temperature in the press container; and/or
transporting the pressed product in the mobile press container to the turning installation of the assembly and pressing in the press container while rotating the press container; and/or
following the pressing step, transporting pomace contained in the mobile press container to a pomace composting plant or pomace further processing plant; and/or
collecting and/or storing and/or transporting the juice obtained from the pressed product during the pressing procedure in a further mobile press container to a juice further processing plant.

19. The method according to claim 18, which comprises using the assembly as a pressurized storage container, or as a transport container for pressed product or as a transport container for juice pressed from the liquid-containing pressed product.

* * * * *